United States Patent
Motoyama (10) Patent No.: US 7,942,062 B2
(45) Date of Patent: May 17, 2011

(54) PRESSURE SENSOR AND METHOD FOR MANUFACTURING THE SAME

(75) Inventor: Hisao Motoyama, Minami (JP)

(73) Assignee: Epson Toyocom Corporation (JP)

( * ) Notice: Subject to any disclaimer, the term of this patent is extended or adjusted under 35 U.S.C. 154(b) by 227 days.

(21) Appl. No.: 12/409,784

(22) Filed: Mar. 24, 2009

(65) Prior Publication Data

US 2009/0241678 A1    Oct. 1, 2009

(30) Foreign Application Priority Data

Mar. 25, 2008  (JP) ................................ 2008-077414
Jan. 15, 2009  (JP) ................................ 2009-006885

(51) Int. Cl.
*G01L 9/00* (2006.01)
(52) U.S. Cl. .......................... 73/717; 73/715; 361/283.4
(58) Field of Classification Search .................. None
See application file for complete search history.

(56) References Cited

U.S. PATENT DOCUMENTS

| | | | |
|---|---|---|---|
| 4,215,570 A | 8/1980 | Eer Nisse | |
| 4,309,908 A | 1/1982 | Rapp et al. | |
| 4,321,500 A | 3/1982 | Paros et al. | |
| 4,372,173 A | 2/1983 | Eer Nisse et al. | |
| 4,382,385 A | 5/1983 | Paros | |
| 4,384,495 A | 5/1983 | Paros | |
| 4,406,966 A | 9/1983 | Paros | |
| 4,455,874 A | 6/1984 | Paros | |
| 4,743,716 A * | 5/1988 | Tsukioka | 200/83 Y |
| 5,457,999 A * | 10/1995 | Feldman | 73/704 |
| 5,488,868 A * | 2/1996 | Ootake et al. | 73/708 |
| 6,497,152 B2 | 12/2002 | Paros et al. | |
| 6,595,054 B2 | 7/2003 | Paros et al. | |
| 7,263,891 B2 * | 9/2007 | Oda | 73/715 |

FOREIGN PATENT DOCUMENTS

| | | |
|---|---|---|
| JP | 56-119519 | 9/1981 |
| JP | 64-009331 | 1/1989 |
| JP | 64-086608 | 3/1989 |
| JP | 02-228534 | 9/1990 |
| JP | 2003-042896 | 2/2003 |
| JP | 2005-017050 | 1/2005 |
| JP | 2006-194736 | 7/2006 |
| JP | 2007-132697 | 5/2007 |

* cited by examiner

*Primary Examiner* — Lisa M Caputo
*Assistant Examiner* — Jermaine Jenkins
(74) *Attorney, Agent, or Firm* — Harness, Dickey & Pierce, P.L.C.

(57) ABSTRACT

A pressure sensor includes: a housing; an attachment having a pressure input orifice communicating with an interior of the housing; a first diaphragm that seals an opening of the pressure input orifice of the attachment, an external surface of the first diaphragm being a pressure receiving surface; a force transmitting member having an end which is coupled approximately perpendicular to a main surface of the first diaphragm, the main surface being opposite from the pressure receiving surface; a swing arm which is joined to the force transmitting member and is held to a retainer at a pivoting point as a fulcrum; and a pressure sensing element having a first end coupled to the retainer and a second end coupled to the swing arm, so that a displacement direction of the force transmitting member is the same direction as a line joining the first end and the second end. In this pressure sensor, the force transmitting member, the swing arm, the pressure sensing element, and the retainer are housed inside the housing, and the retainer is fixed to an inner wall of the housing.

9 Claims, 8 Drawing Sheets

PRESSURE SENSOR AND METHOD FOR MANUFACTURING THE SAME

BACKGROUND

1. Technical Field

The present invention relates to a pressure sensor and a method for manufacturing the same. This pressure sensor does not use oil as a pressure receiving media and therefore is suitable for broadening a scope of application of the pressure sensor.

2. Related Art

Pressure sensors that include piezoelectric resonating elements as pressure sensing elements are known as water pressure meters, barometers, and differential manometers. Piezoelectric resonating elements include, for instance, electrode patterns on planar piezoelectric substrates, having a detection axis in a direction in which a force is detected. When a pressure is applied in the direction of the detection axis, a resonant frequency of the piezoelectric resonating element changes and the pressure is detected using the fluctuation in the resonant frequency. Pressure sensors that use piezoelectric resonating elements as pressure sensing elements are disclosed in JP-A-56-119519, JP-A-64-9331, and JP-A-2-228534. When a pressure is applied to a bellows from a pressure inlet, a force F corresponding to an effective area of the bellows is transmitted to the piezoelectric resonating element as either a compressive force or a tensile force through a force transmitting means that has a pivot as a fulcrum (bend hinge). A stress due to this force F occurs in the piezoelectric resonating element, and this stress changes the resonating frequency. The pressure sensor measures pressures by detecting changes in the resonant frequencies of the piezoelectric resonating element.

Figure 8:
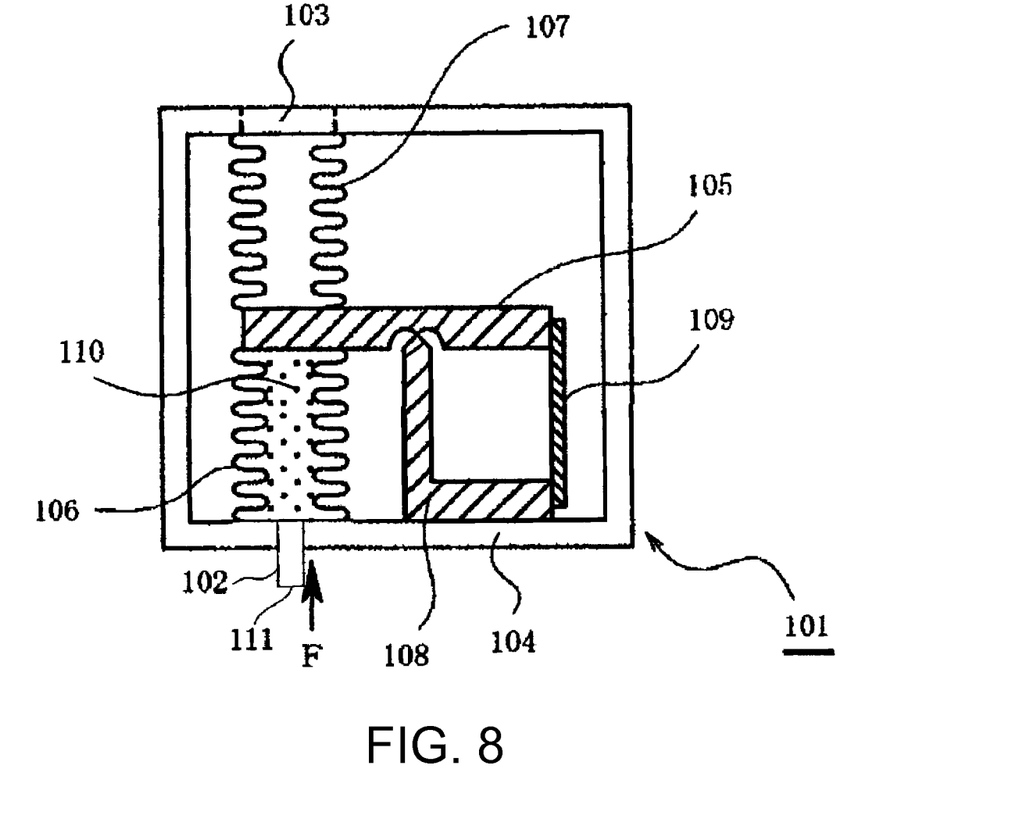
FIG. 8 is a sectional drawing illustrating an example of a structure of a pressure sensor according to related art.

The pressure sensor according to related art will be described with reference to examples disclosed in JP-A-56-119519, JP-A-64-9331, and JP-A-2-228534. FIG. 8 is a sectional drawing illustrating a structure of a pressure sensor according to these examples of related art.

A pressure sensor 101 according to related art shown in FIG. 8 includes a case 104 having a first and a second pressure input orifices 102 and 103 that are arranged to face each other, and a force transmitting member 105 arranged inside the case 104. A first end of the force transmitting member 105 is sandwiched with and coupled to one end of a first bellows 106 and one end of a second bellows 107. The other end of the first bellows 106 is coupled to the first pressure input orifice 102, and the other end of the second bellows 107 is coupled to the second pressure input orifice 103. Moreover, a tuning fork resonator 109 is arranged between a second end of the force transmitting member 105 and an end of a substrate 108, at a side opposite from a pivot (fulcrum).

Fluid is filled inside the bellows of this pressure sensor for detecting pressures in a high precision. Generally, oils such as silicon oil which has high viscosity are used as the fluid, in order to avoid bubbles entering and accumulating inside the bellows or between the folds of the bellows.

Viscous oil 110 is filled into the interior of the first bellows 106 that receives a pressure of the fluid subjected to measuring. In the case of measuring fluid pressure, the oil 110 contacts and faces the fluid at an opening 111 opened at the first pressure input orifice 102. The size of the opening 111 is set so that the oil 110 does not leak out.

In such a pressure sensor 101, when the fluid subjected to pressure measurement applies the pressure F to the oil 110 which is filled inside the first bellows 106, this pressure F is then applied to the first end of the force transmitting member 105 (the pivotably supported swing arm) through the first bellows 106. At the same time, the atmospheric pressure is applied to the second bellows 107 and a force equivalent to the atmospheric pressure is applied to the first end of the force transmitting member 105.

Consequently, a force equivalent to a differential pressure is applied to the double-ended tuning fork resonator 109 through the second end of the force transmitting member 105, either as a compressive force or a tensile force with a pivot of the substrate 108 as a pivoting point. Here, the differential pressure means a pressure difference between the atmospheric pressure and the pressure F applied by the fluid subjected to pressure measurement. One of the compressive force and the tensile force applied to the double-ended tuning fork resonator 109 changes a resonant frequency of the double-ended tuning fork resonator 109 in accordance with a strength of the stress. Therefore, measuring this resonant frequency allows for detecting the size of the pressure F.

Figure 9:
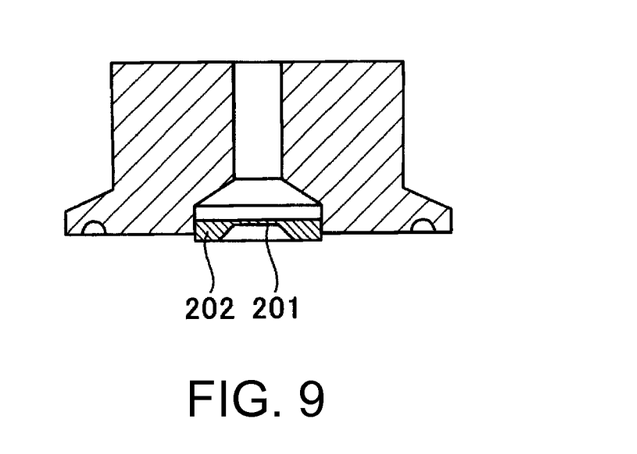
FIG. 9 is a sectional drawing illustrating an example of a structure of a pressure sensor that includes a diaphragm according to related art.

Another pressure sensor that uses diaphragm as means to receive pressure that is subjected to measuring is disclosed in JP-A-2003-42896. As shown in FIG. 9, this pressure sensor includes a diaphragm 201 formed in a shape of either a disk or a plate, and a semiconductor (piezoresistive element) 202 is formed subsequently to forming a silicon oxide thin film and a chromium oxide thin film on the surface of the diaphragm 201. If the diaphragm 201 bends when receiving pressure, the semiconductor 202 distorts, causing a fluctuation in the ohmic value of the semiconductor 202. The pressure sensor gets this ohmic value fluctuation as an electric signal, thereby detecting the pressure change.

Figure 10:
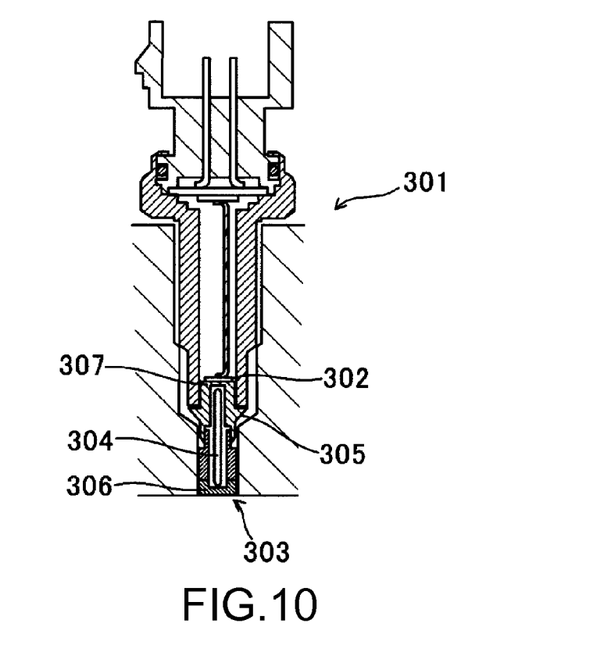
FIG. 10 is an overall sectional view of a pressure sensor in which a metal shaft according to related art transmits pressure from one diaphragm to the other.
Figure 11:
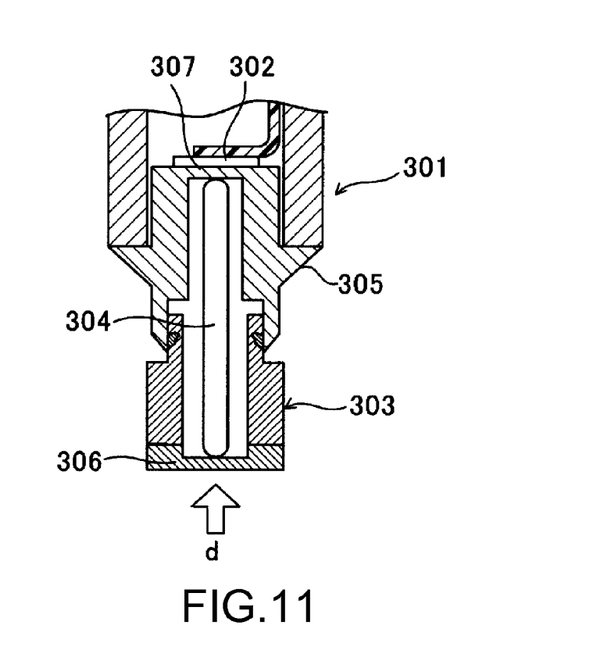
FIG. 11 is a sectional view of a pressure detector in FIG. 10.

JP-A-2006-194736 and JP-A-2007-132697 disclose pressure sensors which are fixed to engine blocks so as to be used to detect hydraulic pressures inside the engines. Such pressure sensors are shown in FIGS. 10 and 11. A pressure sensor 301 includes a sensing unit 302 that outputs electric signals which correspond to an applied pressure, a pressure-receiving diaphragm unit that receives pressure, and a pressure transmitting member 304 for transmitting the pressure from the pressure-receiving diaphragm to the sensing unit 302. Specifically, a first diaphragm 306 and a second diaphragm 307 are respectively installed on each end surface of a hollow metal stem 305, the first diaphragm 306 receiving pressure, and the second diaphragm 307 detecting pressure. The pressure transmitting member 304 is provided between the first diaphragm 306 and the second diaphragm 307 of the stem. The pressure transmitting member 304 is a shaft made of either metal or ceramic, and is provided between a pair of diaphragms (first diaphragm 306 and the second diaphragm 307) in a prestressed state. Further, a chip with a strain gauge functionality (the sensing unit 302) is installed to an outer end surface of the second diaphragm 307 as a pressure detection element, and the pressure transmitting member 304 transmits a pressure received by the first diaphragm 306 to the second diaphragm 307, so that the deformation of the second diaphragm 307 is converted to electronic signals by the strain gauge chip (the sensing unit 302), thereby detecting the hydraulic pressure of the engine.

As recited in JP-A-56-119519, JP-A-64-9331, and JP-A-2-228534, according to the pressure sensor shown in FIG. 8, the oil 110 filled into the first bellows 106 has higher thermal expansion coefficients compared to other elements that constitute the pressure sensor 101, such as the force transmitting member 105 and the double-ended tuning fork resonator 109. Therefore, a temperature change causes thermal distortion of the components constituting the pressure sensor. Such thermal distortion works on the double-ended tuning fork resonator 109 as an unwanted stress, resulting in measured pressure value errors, thereby degrading the characteristics of the pressure sensor.

Moreover, since the oil 110 filled in the first bellows 106 contacts and faces the fluid subjected to pressure measuring, the oil 110 may flow out into this fluid, or, the fluid may flow into the first bellows 106 depending on how the pressure sensor is installed. This may generate bubbles inside the oil 110 filled inside the first bellows 106. A force cannot be stably transmitted through the force transmitting member 105 to the double-ended tuning fork resonator 109, if bubbles are generated in the oil 110 which serves as a pressure transmitting media, thereby possibly inducing an error in the measured pressure value.

Moreover, as described, since the oil 110 contacts and faces the fluid subjected to pressure measuring, the oil 110 may flow out into this fluid depending on how the pressure sensor is installed. Therefore, the pressure sensor using the oil 110 according to related art cannot be used for measuring the pressure of pure fluid that disfavors foreign substance.

In the technique described in JP-A-2003-42896, a semiconductor is formed on a surface of the diaphragm, and therefore the cost of the diaphragm significantly increases. Moreover, in the case of differential pressure detection in which diaphragms are respectively arranged for a pressure receiving unit as well as for a sensing unit, the behavior of the diaphragms differs between the pressure receiving side and the sensing unit side. This is due to the state where while the diaphragms have the same shape, the chip is formed on one of them and thus the mechanical deviations of the diaphragms are not identical. Consequently, there is a drawback of not being able to improve the measurement precision.

According to JP-A-2006-194736 and JP-A-2007-132697, a diaphragm and a shaft are in contact with each other under load. Since a pressure sensor is used at a high temperature in a high pressure, if the diaphragm and the shaft were rigidly fixed, this mechanism may be damaged by the difference in thermal expansion between the components. For this reason, the diaphragm and the shaft only have a point contact, and are not bonded by bonding means such as adhesives. Therefore, there is a very high possibility that this point contact deviates when the pressure change operates the diaphragm and the shaft. As the point contact deviates, a force working in both the diaphragm and the shaft leaks out, resulting in pressure detection with insufficient precision. Moreover, the pressure sensors described in JP-A-2006-194736 and JP-A-2007-132697 are used at a high temperature in a high pressure so as to detect the pressure inside the engine combustion chamber. Therefore, it is desirable that the force transmitting member be as long as possible in order to create a distance between the pressure receiving unit and the sensing unit, thereby avoiding thermal effect on the components such as the chip of the sensing unit. This has not been suitable for application in the techniques which require size reduction. In addition, in the case of JP-A-2006-194736 and JP-A-2007-132697, a force is transmitted having a shaft between a pair of diaphragms. However, since a sensor chip is directly attached to the diaphragm on the sensing unit side, the property of the diaphragms differs between the pressure receiving side and the sensing unit side. While the diaphragms have the same shape, the chip is formed on one of the diaphragms and thus the mechanical deviations of the diaphragms are not identical, resulting in a drawback of not being able to improve the measurement precision.

SUMMARY

An advantage of the invention resolves at least part of the aforementioned problems, and is realized in accordance with the following aspects of the invention.

According to a first aspect of the invention, a pressure sensor includes: a first diaphragm that receives a pressure of an environment subjected to pressure measuring; a shaft which is coupled approximately perpendicular to a main surface of the first diaphragm so as to transmit the pressure; a swing arm which is joined to the shaft and is held to a retainer at a pivoting point as a fulcrum; and a pressure sensing element having a first end coupled to the retainer and a second end coupled to the swing arm, so that the pressure sensing element and the first diaphragm have the same displacement direction; and a housing that houses the shaft, the swing arm, and the pressure sensing element, as well as the retainer joined to an internal surface of the housing, so as to be sealed while exposing the first diaphragm to an external surface.

Here, the first diaphragm functions as a pressure receiving media that receives pressure from the environment subjected to pressure measuring. This eliminates the need to use oil as the pressure receiving media in the pressure sensor. Therefore, no oil leaks into the environment subjected to pressure measuring, allowing the pressure sensor to be used for measuring pressure in an environment such as a pure fluid that disfavors foreign substance.

Moreover, temperature characteristics of the pressure sensor are significantly improved by not using oil as the pressure receiving media that has high thermal expansion coefficients. An interior of the housing serves as a vacuum chamber in the pressure sensor. This improves the Q-factor of the pressure sensing element and ensures stable resonant frequencies. At the same time, it is possible to remove volatile gas generated from oxygen and adhesives. Consequently, a long-term stability is ensured in the pressure sensor.

In this case, the pressure sensor may further include a second diaphragm on the external surface of the housing at a side facing the first diaphragm, the second diaphragm being joined to the swing arm through the shaft so as to receive an atmospheric pressure as well as to sense a differential pressure between the atmospheric pressure and the pressure of an environment subjected to pressure measuring.

This allows for measuring a gauge pressure expressed relative to the atmospheric pressure as a reference of zero. The hydrostatic characteristic (a constant pressure without deviation) is improved by employing an identical diaphragm as the pressure receiving medium for both a measurement target and the atmosphere. Moreover, the second diaphragm is joined to the swing arm through the shaft, which means that the same material is used for both the atmosphere side and the measurement target side. This counteracts linear expansion which depends on a peripheral temperature change, and improves the temperature characteristics of the pressure sensor.

In this case, the pressure sensor further may include the second diaphragm on the external surface of the housing at the side facing the first diaphragm, the second diaphragm being joined to the swing arm through a flexible bellows so as to receive the atmospheric pressure as well as to sense the differential pressure between the atmospheric pressure and the pressure in an environment subjected to pressure measuring.

This allows for measuring a gauge pressure expressed relative to the atmospheric pressure as a reference of zero. The hydrostatic characteristic (a constant pressure without deviation) is improved by employing an identical diaphragm as the pressure receiving medium for both a measurement target and the atmosphere. Moreover, joining the second diaphragm to the swing arm with the flexible bellows therebetween facilitates an assembly of the pressure sensor, thereby simplifying the manufacturing process.

In this case, the pressure sensing element of the pressure sensor may be one of a double-ended tuning fork resonator, a thickness shear resonator, and a surface acoustic wave device.

In a double-ended tuning fork resonator, a thickness shear resonator, and a surface acoustic wave device, the resonant frequency changes with the tensile-compressive stress. This facilitates the realization of the pressure sensor. The double-ended tuning fork resonator, in particular, has high resolution capability and a desirable sensitivity for tensile-compressive stress. Therefore, using the double-ended tuning fork resonator allows for realization of the pressure sensor that detects the slightest differential pressure.

In this pressure sensor, a material of the first and the second diaphragms may be one of metal, ceramic, and piezoelectric crystal.

Selecting and using the material for the diaphragms in accordance with the materials to be measured allows for producing a stable and high-precision pressure sensor. Such materials include single crystals such as quartz, highly corrosive-resistant materials such as ceramics and metals (e.g. stainless steel).

In this pressure sensor, a material of the shaft may be one of stainless steel, aluminum, and ceramic.

Ceramic is easy to process while stainless steel and aluminum are materials with high strength and stability. Selecting and using the material for the shaft in accordance with the usage of the pressure sensor allows for producing a stable pressure sensor that has high precision.

In this pressure sensor, ceramic may be used as a material of the housing at a periphery of a portion that houses the pressure sensing element.

This reduces an affect on the pressure sensing element originating from the distortion caused by heat.

In this case, a pressure input orifice may be opened at a pipe sleeve protruding from the housing and having an external thread, thereby allowing for screwing and thereby attaching the pressure sensor to another apparatus.

Consequently, the pressure sensor is fixedly attached to another apparatus.

In this pressure sensor, the pressure input orifice may be directly opened on a housing wall so that the diaphragm is formed in a same plane as the housing wall.

In this structure, there is no protrusion on the external surface of the pressure sensor, providing more freedom when attaching the pressure sensor to another apparatus.

According to a second aspect of the invention, a method for manufacturing a pressure sensor includes: welding a diaphragm to a pressure input orifice opened in a housing capable of being air tightly sealed so as to seal the pressure input orifice; coupling a pressure transmitting shaft to a center of the diaphragm, the pressure transmitting shaft having an axis in a direction of movement of the diaphragm; housing a swing lever and a retainer inside the housing concurrently with coupling the pressure transmitting shaft, so as to bond the retainer to the housing, a first end of the swing lever being coupled to the pressure transmitting shaft and the retainer pivotably supporting the swing lever; bonding a pressure sensing element between the retainer at a side adjacent to the housing and a second end of the swing lever, so that a detection axis of the pressure sensing element becomes parallel to the pressure transmitting shaft; and attaching a cover so as to seal an interior of the housing.

This manufacturing method eliminates operations such as oil filling and thereby improves manufacturing efficiency of a pressure sensor.

According to a third aspect of the invention, a method for manufacturing a pressure sensor includes: welding a first diaphragm to one of a coaxial pair of pressure input orifices opened in a housing capable of being air-tightly sealed so as to seal the one of the pressure input orifices; coupling a first end of a pressure transmitting shaft to a center of the first diaphragm, the pressure transmitting shaft having an axis in a direction of movement of the first diaphragm; housing a swing lever and a retainer inside the housing concurrently with coupling the pressure transmitting shaft, a first end of the swing lever being coupled to the pressure transmitting shaft and the retainer pivotably supporting the swing lever; welding a second diaphragm so as to seal the other pressure input orifice, and coupling a second end of the pressure transmitting shaft to a center of the second diaphragm; subsequently bonding the retainer to the housing; bonding a pressure sensing element between the retainer at a side adjacent to the housing and a second end of the swing lever, so that a detection axis of the pressure sensing element becomes parallel to the pressure transmitting shaft; and attaching a cover so as to seal an interior of the housing.

This manufacturing method eliminates operations such as oil filling and thereby improves manufacturing efficiency of a pressure sensor that detects a differential pressure.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will now be described in detail using embodiments illustrated in drawings. In these embodiments, fluid is cited as an example of a measurement target.

Figure 1:
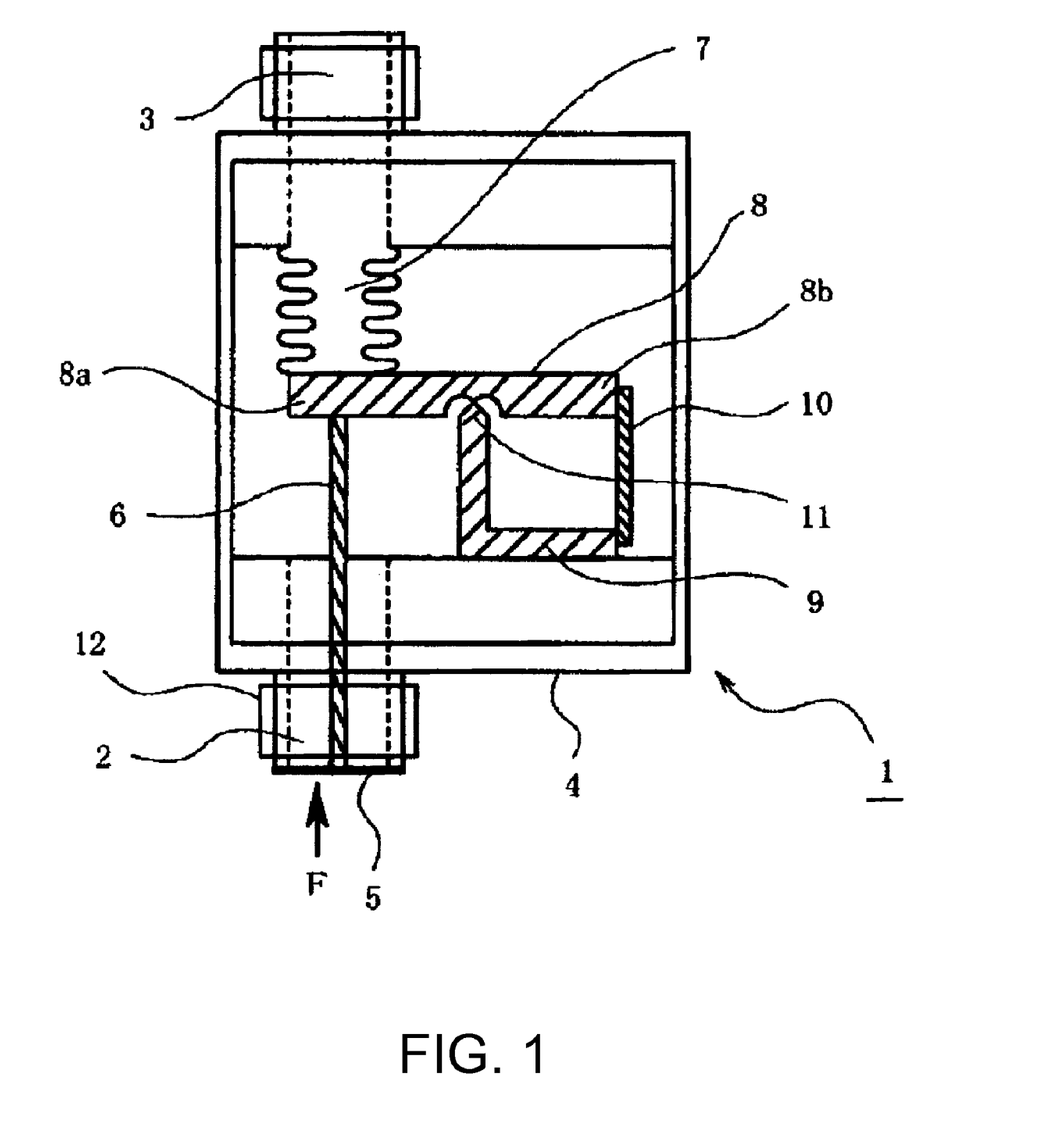
FIG. 1 is a schematic view illustrating a structure of a first embodiment of a pressure sensor according to the invention.

FIG. 1 is a schematic cross-sectional view illustrating a structure of a first embodiment of a pressure sensor according to the invention.

A pressure sensor 1 shown in FIG. 1 includes a housing 4 which is a rectangular container with a vacuumed interior. Two pipe sleeves, serving as first and second attachments, are installed, protruding from the opposing end surface plates of the housing 4, and are coaxially arranged to face each other. The two pipe sleeves respectively include a first pressure input orifice 2 and a second pressure input orifice 3 which communicate to an interior of the housing 4. Components which will be described hereafter are housed inside the housing 4. A first (pressure receiving) diaphragm 5 is attached to an edge of the first pressure input orifice 2. The first diaphragm 5 is exposed outside the housing 4 and bends in accordance with a pressure of fluid subjected to measuring. A first shaft 6 (a first force transmitting member) is attached to the first diaphragm 5, with a first end of the first shaft 6 perpendicularly coupled to a center of a main surface of the first diaphragm 5 at an interior side of the housing 4. At the same time, a bellows 7 that receives a pressure from an atmosphere is attached to the second pressure input orifice 3, and the second pressure input orifice 3 is open to the atmosphere. The bellows 7 therefore works as a vacuum barrier, parting a vacuumed interior of the housing 4 from an exterior, while allowing the atmospheric pressure to be applied an end of a swing arm described later.

A swing arm 8 (a second force transmitting member) functions as a pressure transmitting member, and applies a differential pressure of an atmospheric pressure and a pressure of fluid subjected to measuring to a pressure sensing element 10. A pivot 11 provided in a retainer 9 serves as a fulcrum, holding the swing arm 8.

An end 8a of the swing arm 8 is sandwiched and coupled to a second end of the first shaft 6 as well as to one end of the bellows 7. At the same time, an end 8b of the swing arm 8 is coupled to one end of the pressure sensing element 10. The pressure sensing element 10 is fixed between the retainer 9 and the end 8b of the swing arm 8, so that the pressure sensing element 10 and the first diaphragm 5 are displaced in one direction.

In other words, the pressure sensing element 10 is fixed in a manner in which supporting points at both ends of the pressure sensing element 10 are arranged along a force detection axis and are respectively coupled to and supported by the end 8b of the swing arm 8 and the retainer 9.

As shown in FIG. 1, this pressure sensor 1 is attached to a housing container of fluid subjected to measuring using, for instance, a component such as an attachment 12 having a spiral guide on its circumference, so that the attachment 12 functions as a screw. Thus the first diaphragm 5 directly receives a pressure of an environment subjected to measurement, for instance, a fluid pressure, from the first diaphragm 5 contacting the fluid subjected to measuring. A prescribed shape and thickness need to be defined for the attachment 12, depending on the strength of a pressure of a fluid subjected to measuring and a structure of the housing container of the fluid.

The first diaphragm 5 is an elastic pressure receiving element, and a first side thereof is a pressure receiving surface that faces outside. This pressure receiving surface bends and deforms when receiving an external pressure subjected to measurement, thereby applying an axial force to an end surface of the first shaft 6 that is in contact with a center region 40 on a second side of the first diaphragm 5.

The first diaphragm 5 bends toward the first shaft 6 when a pressure F subjected to measuring is applied from the fluid which is in contact with the first diaphragm 5, thereby transmitting the pressure F to the end 8a of the swing arm 8 through the first shaft 6. Here, an atmospheric pressure is applied to the bellows 7, and a pressure equivalent to the atmospheric pressure is also transmitted to the end 8a of the swing arm 8.

Consequently, the pressure sensing element 10 receives a force equivalent to a differential pressure between the atmospheric pressure and the pressure F of the fluid subjected to measuring, as one of a compressive force and a tensile force through the end 8b of the swing arm 8 that has a pivot 11 as a pivoting point. One of the compressive force or the tensile force applied to the pressure sensing element 10 generates stress therein, thereby changing a resonant frequency of the pressure sensing element 10 in accordance with strength of the stress. Therefore, measuring this resonant frequency allows for obtaining the pressure value relative to the atmospheric pressure as a reference of zero, using devices such as a microcomputer.

The pressure sensing element 10 is made of piezoelectric materials such as quartz crystal, lithium niobate, and lithium tantalite, and is formed as an element such as a double-ended tuning fork resonator, a surface acoustic wave (SAW) resonator, and a thickness shear resonator. As described, the pressure sensing element 10 is fixed in a manner in which supporting points at both ends of the pressure sensing element 10 are arranged along a force detection axis and are respectively coupled to and supported by the end 8b of the swing arm 8 and by the retainer 9.

Here, the pressure sensing element 10 has a detection axis in the direction in which a power is detected, and a line joining both ends of the pressure sensing element 10 is parallel to the detection axis. Moreover, the pressure sensing element 10 is electrically coupled with an un-illustrated oscillation circuit attached to the housing 4, and oscillates with an alternating voltage supplied from the oscillation circuit in an inherent resonant frequency. A tensile (stretching) force and a compressive force from the end 8b of the swing arm 8 applied to the pressure sensing element 10 generates one of tensile and compressive stress therein, thereby causing the resonant frequency to fluctuate.

The double-ended tuning fork resonator, in particular, is suitable for a pressure sensor that detects a slight differential pressure, the pressure sensor having high precision and excellent resolution capability. Specifically, compared to resonators such as a thickness shear resonator, the double-ended tuning fork resonator produces a significantly larger resonant frequency change and the variable range that corresponds to the tensile and compressive stress. In the double-ended tuning fork resonator, the tensile stress decreases amplitude of an oscillating arm (vibration unit), thereby increasing the resonant frequency, while the compressive stress increases amplitude of the oscillating arm, thereby decreasing the resonant frequency. A preferable material for a piezoelectric substrate of the double-ended tuning fork resonator includes quartz which has an excellent temperature characteristic.

At the time of coupling the first shaft 6 perpendicular to the first diaphragm 5, it is required to keep the perpendicularity of the first shaft 6 in a high precision, in order to increase the measurement precision of the pressure sensor.

Figure 2:
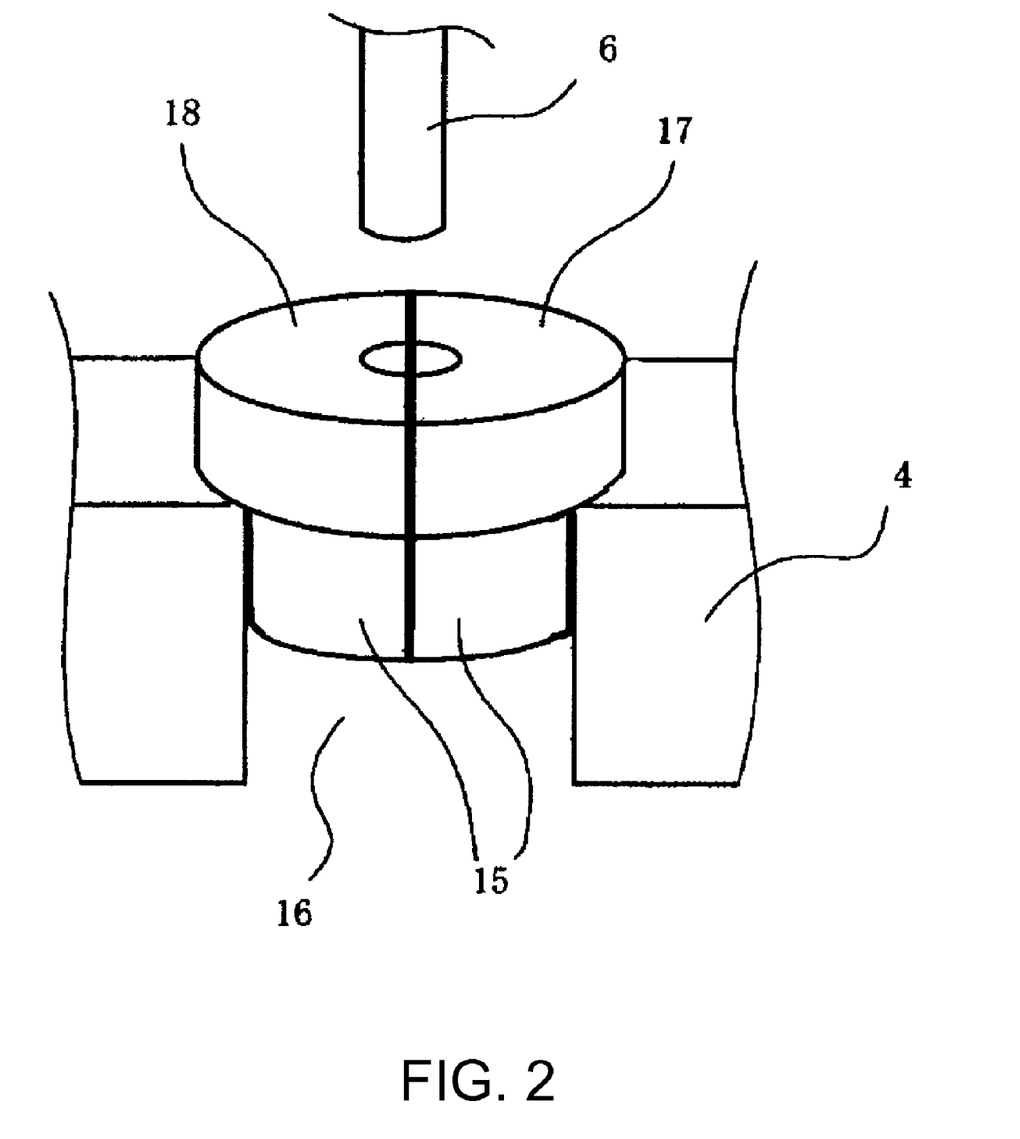
FIG. 2 is a drawing illustrating an assembly method using a positioning jig.

In this embodiment therefore, the first shaft 6 is assembled with an assembly method using a positioning jig illustrated in FIG. 2.

FIG. 2 is a drawing illustrating an assembly method using a positioning jig.

A positioning jig 15 can be divided into two semicircular blocks which together form a shape of a slotted cylinder. The positioning jig 15 can be closely inserted to a hole 16 that communicates with the first pressure input orifice 2 provided in the housing 4. After arranging the positioning jig 15 to the hole 16, the first shaft 6 is inserted to the center of the positioning jig 15. Thereafter, one end of the first shaft 6 which is inserted and the center of the pressure receiving surface of the first diaphragm 5 (not shown) are joined with bonding and the like. Subsequently, a first block 17 and a second block 18 of the positioning jig 15 are separated and removed. Consequently the first shaft 6 is connected to the first diaphragm 5 in a perpendicular direction in a high precision, and thereby improving the measurement precision of the pressure sensor.

Materials suitable for the first diaphragm 5 have excellent corrosion resistance, and examples thereof include metals such as stainless steel, and ceramic. Other examples include single crystals such as quartz crystal or other amorphous bodies. Particularly, for the first diaphragm 5 that contacts the fluid subjected to measuring, it is desirable to select materials that are not sensitive to effects such as corrosion and degradation from the contact with the fluid. Moreover, while it is desirable to use the same material (such as stainless steel and ceramics) for both the first diaphragm 5 and the first shaft 6 so that the thermal expansion coefficients of the two conform, different materials may also be used.

The housing interior is vacuumed in the pressure sensor 1 according to the embodiment. This improves the Q-factor of the pressure sensing element 10 and ensures a stable resonant frequency.

Moreover, a swing arm system employed in this pressure sensor 1 allows for obtaining stable frequency output signals when there are external vibrations being applied. Using this system together with a diaphragm structure that does not use pressure transmitting media such as oil allows for measuring the fluid pressure subjected to measurement in high precision.

Further, using the bellows 7 that does not use oil as a pressure receiving media at the atmospheric pressure side facilitates the assembling of the pressure sensor 1, thereby simplifying the manufacturing process of the pressure sensor.

As described, a diaphragm is used as a pressure receiving means that contacts the fluid subjected to measuring, in the pressure sensor 1 of the first embodiment, eliminating the need to use oil as the pressure transmitting media, so that no oil leaks into the fluid side. Therefore, the pressure sensor 1 can be used for applications such as measuring a pressure of pure fluid that disfavors foreign substance.

A second embodiment of a pressure sensor according to the invention will now be described.

Figure 3:
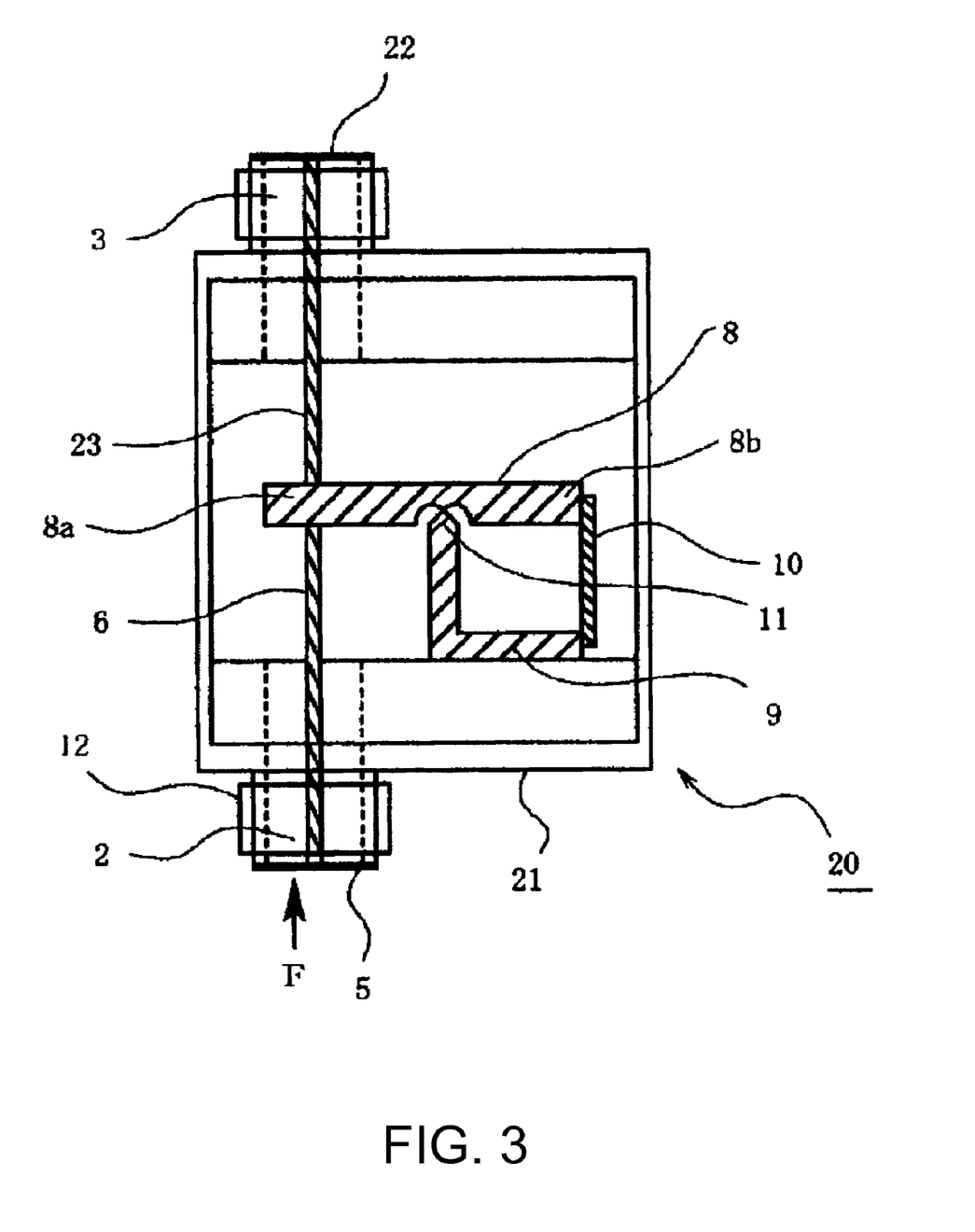
FIG. 3 is a schematic view illustrating a structure of a second embodiment of the pressure sensor according to the invention.

FIG. 3 is a schematic view illustrating a structure of the second embodiment of the pressure sensor according to the invention. The same signs and numerals are used for the same parts as in FIG. 1, and their descriptions are omitted.

In the first embodiment, the bellows 7 is used as the pressure receiving means for the atmospheric pressure. Alternatively, in the second embodiment, a second diaphragm 22 and a second shaft 23 are used as the pressure receiving means for the atmospheric pressure. The second diaphragm 22 and the second shaft 23 are similar to the ones used as the pressure receiving means for the fluid subjected to measuring. As shown in FIG. 3, the second diaphragm 22 is formed so as to be exposed at an external surface of the housing which is at a opposite side from the first diaphragm 5, and one end of the second shaft 23 is joined to the center of a back side of the pressure receiving surface of the second diaphragm 22, while the other end of the second shaft 23 is joined to the swing arm 8.

In a pressure sensor 20 shown in FIG. 3, the first diaphragm 5 bends toward the first shaft 6 when the pressure F is applied from the fluid which is in contact with the first diaphragm 5, thereby applying the pressure F to the end 8a of the swing arm 8 through the first shaft 6. At the same time, an atmospheric pressure is applied to the second diaphragm 22, and a force equivalent to the atmospheric pressure is applied to the end 8a of the swing arm 8 through the second diaphragm 22 and the second shaft 23. Consequently, the pressure sensing element 10 receives a force equivalent to a differential pressure between the pressure F of the fluid applied to the first diaphragm 5 and the atmospheric pressure applied to the second diaphragm 22, as one of a compressive force and a tensile force through the end 8b of the swing arm 8 that has a pivot 11 as a pivoting point. One of the compressive force or the tensile force applied to the pressure sensing element 10 generates one of compressive stress and tensile stress therein, thereby changing a resonant frequency. Therefore, measuring this resonant frequency allows for obtaining the pressure value relative to the atmospheric pressure as a reference of zero, using devices such as a microcomputer.

In order to increase the measuring precision of the pressure sensor, it is required, also in the second embodiment, to keep the perpendicularity of the first shaft 6 and the second shaft 23 in a high precision, when coupling one end of the first shaft 6 perpendicular to the center of the back side of the pressure receiving surface of the first diaphragm 5, as well as when coupling one end of the second shaft 23 perpendicular to the center of the back side of the pressure receiving surface of the second diaphragm 22. Therefore, it is necessary to increase the perpendicularity precision between the diaphragms and the shafts by assembling the pressure sensor 20 using the slotted cylinder positioning jig described in the first embodiment.

While two shafts, the first shaft 6 and the second shaft 23, are used in FIG. 3, one shaft may also be used, both ends respectively joined with bonding and the like to the centers of the back sides of the pressure receiving surfaces of the first and the second diaphragms. In this case, the desirable methods include opening a hole at the end 8a of the swing arm 8 so as to pierce and fit the shaft to the hole, and joining a shaft and an end surface of the swing arm.

The pressure sensor 20 of the second embodiment reduces the effect caused by the fluctuation in the atmospheric pressure and improves a hydrostatic characteristic (a constant pressure when there is no deviation). This is achieved by a diaphragm structure in which conditions and materials are the same among the pressure receiving medium of the fluid subjected to measuring and the pressure receiving medium of the atmospheric pressure. Moreover, employing the same materials and conditions not only to the two diaphragms but also to the shafts coupled to the two diaphragms in the pressure sensor 20 functions to counteract the change in volume of the components originating from thermal expansion. Consequently, it is possible to realize the pressure sensor with high precision without being affected by the temperature change. Moreover, costs of shafts are lower than those of bellows, and therefore, compared to the first embodiment, the second embodiment allows for low cost manufacturing.

Subsequently, a third embodiment of a pressure sensor according to the invention will now be described.

Figure 4:
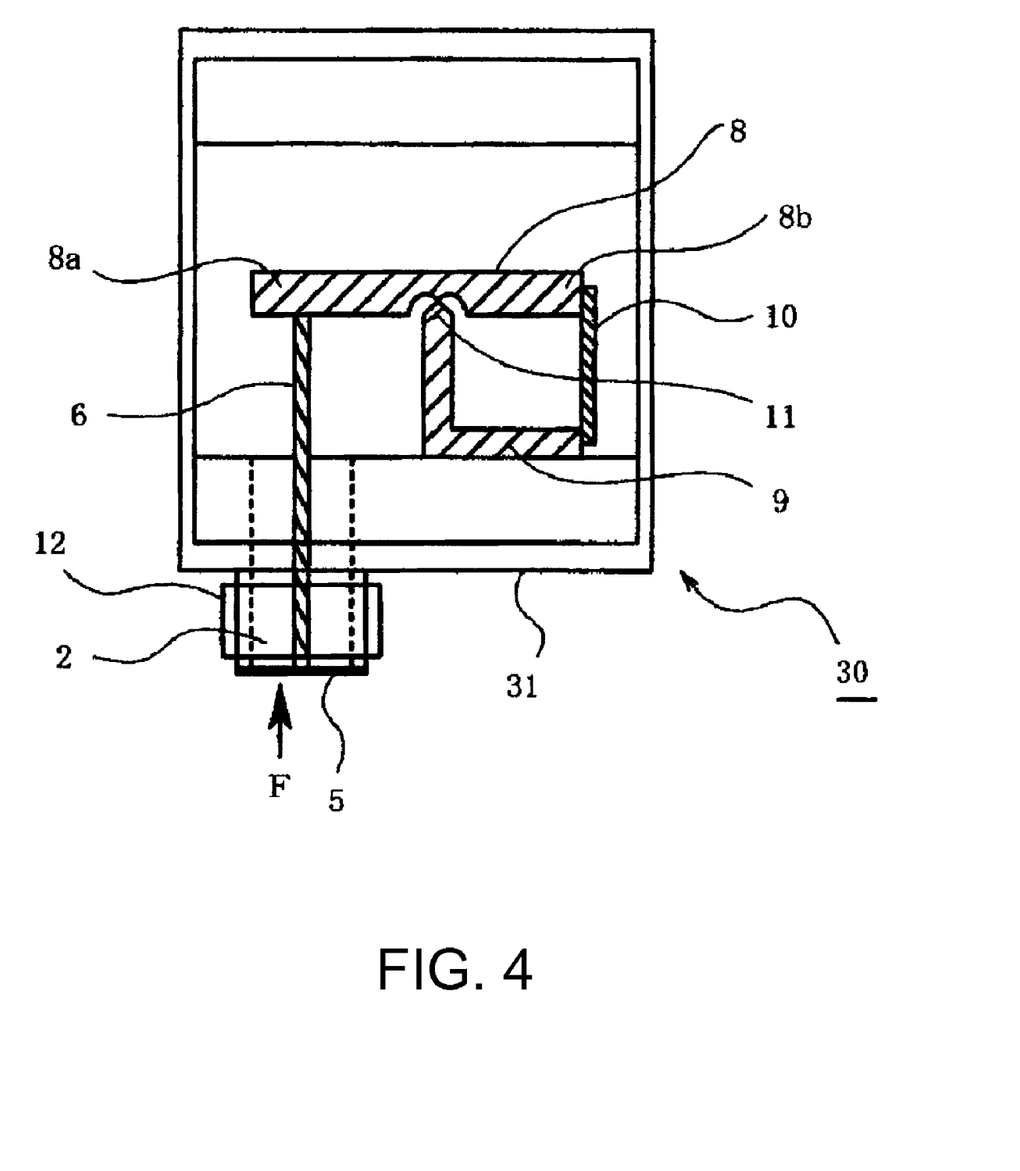
FIG. 4 is a schematic view illustrating a structure of a third embodiment of the pressure sensor according to the invention.

FIG. 4 is a schematic view illustrating a structure of a third embodiment of the pressure sensor according to the invention. The same signs and numerals are used for the same parts as in FIG. 1, and their descriptions are omitted. The pressure sensors according to the first and the second embodiments of the invention measure a gauge pressure (relative pressure), i.e. a pressure represented by having the atmospheric pressure as a reference of zero, and therefore the pressure receiving means for the atmospheric pressure is coupled to the end 8a of the swing arm 8. A pressure sensor according to the third embodiment measures an absolute pressure with respect to a vacuum state as a reference of zero. Therefore, only the pressure receiving means for the fluid subjected to measuring is coupled to the end 8a of the swing arm 8, and the pressure receiving means for the atmospheric pressure is removed.

In a pressure sensor 30, only the pressure receiving means for the fluid subjected to measuring is coupled to the end 8a of the swing arm 8, and therefore a force originating from the pressure F of the fluid is applied to the end 8a of the swing arm 8. Consequently, the end 8b of the swing arm 8 that has a pivot 11 as a pivoting point receives only a force equivalent to the pressure F applied to the first diaphragm 5, the force being applied to the pressure sensing element 10 as one of a compressive force and a tensile force. In the third embodiment, the pressure sensor functions as an absolute pressure sensor.

Figure 5A:
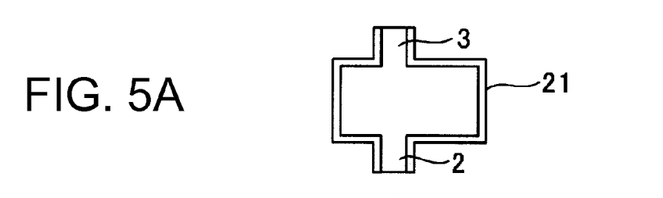
FIGS. 5A through 5F are process drawings illustrating a method for manufacturing the pressure sensor according to the invention.
Figure 5B:
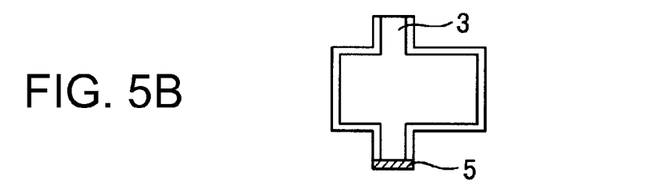
Figure 5C:
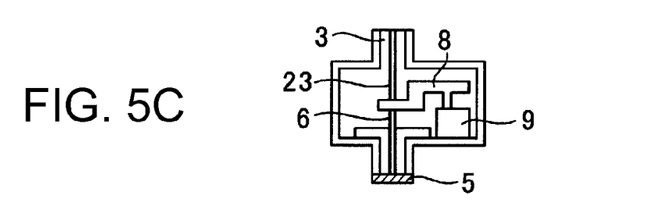

FIGS. 5A through 5F are process drawings illustrating a method for manufacturing the pressure sensor. The pressure sensor 20 of the second embodiment is manufactured according to these process drawings. The housing 21, capable of being air-tightly sealed, of the pressure sensor 20 is prepared (FIG. 5A). The first diaphragm 5 is welded and sealed to one of a coaxial pair of pressure input orifices 2 and 3 opened in the housing 21 (FIG. 5B). Thereafter, the first (pressure transmitting) shaft 6 and the second (pressure transmitting) shaft 23 are coupled to the center of the first diaphragm 5, those first and the second pressure transmitting shafts having an axis in a direction of movement of the first diaphragm 5 (FIG. 5C). The positioning jig 15 shown in FIG. 2 is used for coupling the first shaft 6 (second shaft 23) to the first diaphragm 5. The first and the second shafts 6 and 23 have a monolithic shaft structure. The swing arm 8 and the retainer 9 are attached in advance to this first shaft 6 (second shaft 23), with one end of the swing arm 8 penetrated by the first shaft 6 (second shaft 23) and the retainer 9 pivotably supporting the swing arm 8. Therefore, these are housed inside the housing 21 by arranging the first shaft 6 (second shaft 23) into the housing 21.

Figure 5D:
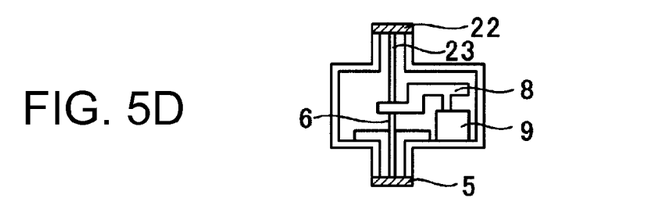
Figure 5E:
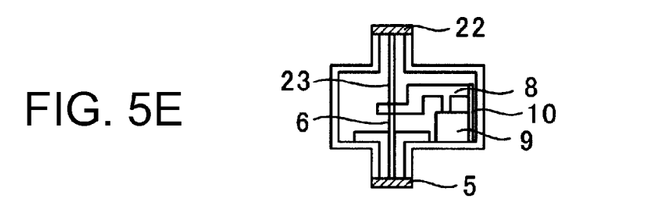
Figure 5F:
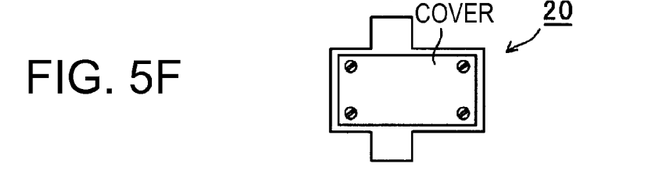

Subsequently, the second diaphragm 22 is welded and sealed to the second pressure input orifice 3, and the other end of the second shaft 23 (first shaft 6) is coupled to the center of the second diaphragm 22 with an adhesive (FIG. 5D). Thereafter, the swing arm 8 and the first shaft 6 (second shaft 23) are bonded, and the retainer 9 is then bonded to the housing 21, followed by bonding the pressure sensing element 10 between the other end of the swing arm 8 and the retainer 9 at a side adjacent to the housing 21, so that the detection axis becomes parallel to the first shaft 6 (second shaft 23), i.e. pressure transmitting shafts (FIG. 5E). Finally, a cover is attached to the housing 21 so as to seal the interior of the housing 21 in an air-tight manner, thereby completing the manufacturing (FIG. 5F).

The embodiments of the pressure sensor are described as the above. The pressure sensing element is not limited to the double-ended tuning fork resonator, and may include any piezoelectric resonator in which the resonant frequency is changed by tensile-compressive stress, for instance, a tuning fork resonator, a surface acoustic wave device, and a thickness shear resonator.

A surface of the diaphragm which detects the pressure of the fluid subjected to measuring may be coated in order to prevent the diaphragm from corrosion caused by, for instance, fluids. For instance, if the diaphragm is metallic, then a nickel compound may be coated thereon, and if the diaphragm is a piezoelectric crystal such as quartz crystal, then silicon may be coated thereon.

While metal such as stainless steel is selected for the housing, selecting ceramics for the peripheral portion of the pressure sensing element allows for reducing an affect originating from the distortion caused by heat on the pressure sensing element.

Description of the embodiments of the pressure sensor according to the invention refers to a case in which fluid is an object for pressure measuring. However, the object is not limited to fluids and may include substance such as gas.

Figure 6A:
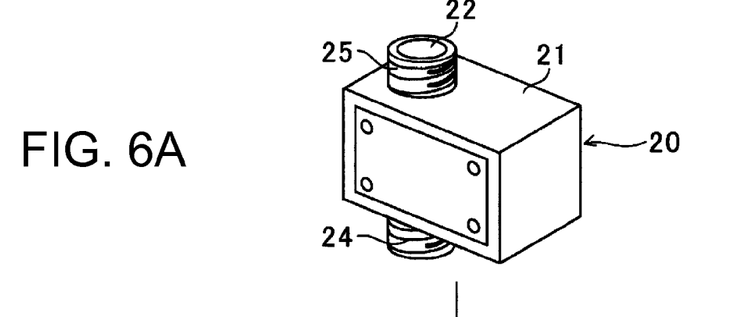
FIG. 6A is an external perspective view of the pressure sensor and FIG. 6B is a sectional view illustrating how this pressure sensor is attached.
Figure 6B:
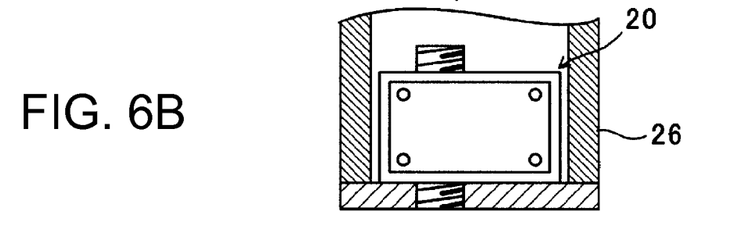
Figure 7A:
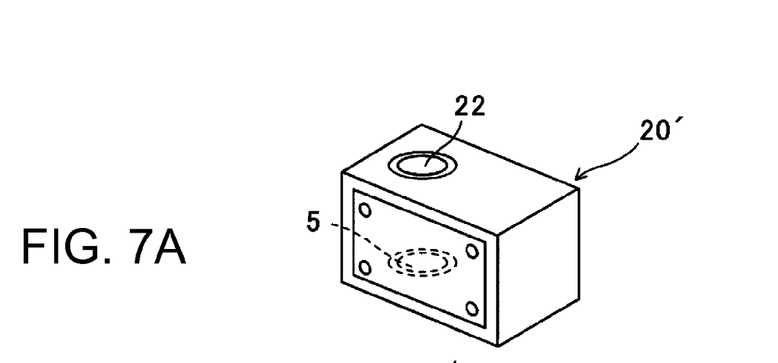
FIG. 7A is an external perspective view of another pressure sensor and FIG. 7B is a sectional view illustrating how this pressure sensor is attached.
Figure 7B:
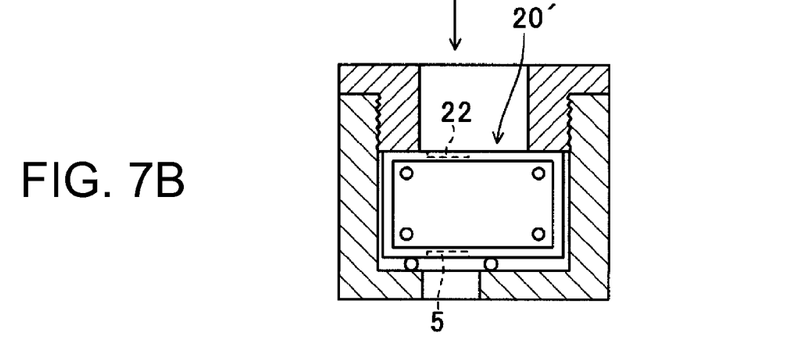

As described in the first through the third embodiments shown in FIGS. 1, 3, and 4, the first and the second pressure input orifices 2 and 3 are opened at the end edges of the pipe sleeves projecting out from the housing. However, the first and the second pressure input orifices 2 and 3 may also be opened directly on the end plates of the housing, without the protrusion of the pipe sleeves. The first and the second pressure input orifices 2 and 3 are opened at the pipe sleeves 24 and 25 that are protruding from the housing as shown in FIGS. 6A and 6B. The pipe sleeves 24 and 25 have external threads, so that the pressure sensor 20 is screwed in and is therefore securely attached and fixed to an apparatus case 26. As shown in FIGS. 7A and 7B, considering the flexibility in the manner of attaching the pressure sensor 20, the pressure input orifices are directly opened on the end plates of the housing 21 so that the first and the second diaphragms 5 and 22 are aligned in the same plane as the housing wall, and therefore the projections are eliminated from an external surface of a pressure sensor 20'. This increases the freedom in attaching the pressure sensor 20' to an apparatus case 27.

The entire disclosure of Japanese Patent Application Nos. 2008-077414, filed Mar. 25, 2008 and 2009-006885, filed Jan. 15, 2009 are expressly incorporated by reference herein.

What is claimed is:

1. A pressure sensor, comprising:
  a housing;
  an attachment having a pressure input orifice communicating with an interior of the housing;
  a first diaphragm that seals an opening of the pressure input orifice of the attachment, an external surface of the first diaphragm being a pressure receiving surface;
  a force transmitting member having an end which is coupled approximately perpendicular to a main surface of the first diaphragm, the main surface being opposite from the pressure receiving surface;
  a swing arm which is joined to the force transmitting member and is held to a retainer at a pivoting point as a fulcrum; and
  a pressure sensing element having a first end coupled to the retainer and a second end coupled to the swing arm, so that a displacement direction of the force transmitting member is the same direction as a line joining the first end and the second end;
wherein:
  the force transmitting member, the swing arm, the pressure sensing element, and the retainer are housed inside the housing; and
  the retainer is fixed to an inner wall of the housing.

2. The pressure sensor according to claim 1, further comprising a second diaphragm on an external surface of the housing at a side facing the first diaphragm, the second diaphragm being joined to the swing arm through a shaft so as to receive an atmospheric pressure and to sense a differential pressure between the atmospheric pressure and a pressure of an environment subjected to pressure measuring.

3. The pressure sensor according to claim 1, further comprising a second diaphragm on an external surface of the housing at a side facing the first diaphragm, the second diaphragm being joined to the swing arm through a flexible bellows so as to receive an atmospheric pressure and to sense a differential pressure between the atmospheric pressure and a pressure in an environment subjected to pressure measuring.

4. The pressure sensor according to claim 1, wherein the pressure sensing element is one of a double-ended tuning fork resonator, a thickness shear resonator, and a surface acoustic wave device.

5. The pressure sensor according to claim 1, wherein a material of the first and the second diaphragms is one of metal, ceramic, and piezoelectric crystal.

6. The pressure sensor according to claim 1, wherein a material of the shaft is one of stainless steel, aluminum, and ceramic.

7. The pressure sensor according to claim 1, wherein a material of the housing at a periphery of a portion that houses the pressure sensing element is ceramic.

8. A pressure sensor, comprising:
a housing;
a pressure input orifice;
a diaphragm that seals an opening of the pressure input orifice, an external surface of the diaphragm being a pressure receiving surface;
a force transmitting member having an end which is coupled approximately perpendicular to a main surface of the first diaphragm, the main surface being opposite from the pressure receiving surface;
a swing arm which is joined to the force transmitting member and is held to a retainer at a pivoting point as a fulcrum; and
a pressure sensing element having a first end coupled to the retainer and a second end coupled to the swing arm, so that a displacement direction of the force transmitting member is the same direction as a line joining the first end and the second end;

wherein:
the force transmitting member, the swing arm, the pressure sensing element, and the retainer are housed inside the housing;
the retainer is fixed to an inner wall of the housing; and
the pressure input orifice is directly opened on a housing wall so that the diaphragm is formed in a same plane as the housing wall.

9. A method for manufacturing a pressure sensor, comprising:
welding a diaphragm to a pressure input orifice opened in a housing capable of being air-tightly sealed so as to seal the pressure input orifice;
coupling a pressure transmitting shaft to a center of the diaphragm, the pressure transmitting shaft having an axis in a direction of movement of the diaphragm;
housing a swing lever and a retainer inside the housing concurrently with coupling the pressure transmitting shaft, so as to bond the retainer to the housing, a first end of the swing lever being coupled to the pressure transmitting shaft and the retainer pivotably supporting the swing lever;
bonding a pressure sensing element between the retainer at a side adjacent to the housing and a second end of the swing lever, so that a detection axis of the pressure sensing element becomes parallel to the pressure transmitting shaft; and
attaching a cover so as to seal an interior of the housing.

* * * * *